United States Patent [19]

Yamazaki et al.

[11] Patent Number: 5,202,391
[45] Date of Patent: Apr. 13, 1993

[54] POLYURETHANE ADHESIVE OF EPOXY RESIN, POLYISOCYANATE, PHOSPHORUS OXY ACID, AND CARBOXYLIC ACID

[75] Inventors: Kyuya Yamazaki, Ibaraki; Hiroto Ryoshi, Shimizu; Teruo Hori, Toyonaka, all of Japan

[73] Assignee: Takeda Chemical Industries, Ltd., Osaka, Japan

[21] Appl. No.: 805,931

[22] Filed: Dec. 12, 1991

Related U.S. Application Data

[62] Division of Ser. No. 370,747, Jun. 20, 1989, Pat. No. 5,096,980.

[30] Foreign Application Priority Data

Jun. 28, 1988 [JP] Japan .................. 63-162256

[51] Int. Cl.$^5$ ............ C08L 63/02; C08L 67/02; C08L 75/06
[52] U.S. Cl. .................. 525/438; 525/111; 525/423; 525/454; 525/528
[58] Field of Search ........... 525/111, 423, 438, 454, 525/528

[56] References Cited

U.S. PATENT DOCUMENTS

| | | | |
|---|---|---|---|
| 3,170,833 | 2/1965 | Noyes | 161/186 |
| 3,423,270 | 1/1969 | Heins | 525/528 |
| 4,401,499 | 8/1983 | Kaneko et al. | 156/307.3 |
| 4,507,447 | 3/1985 | Yamazaki et al. | 525/528 |
| 4,613,660 | 9/1986 | Goel et al. | 528/73 |
| 4,654,409 | 3/1987 | Shirai et al. | 528/26 |
| 4,739,020 | 4/1988 | Carson et al. | 525/528 |

FOREIGN PATENT DOCUMENTS 61-47775 3/1986 Japan .
61-209282 9/1986 Japan .

*Primary Examiner*—Robert E. Sellers
*Attorney, Agent, or Firm*—Wenderoth, Lind & Ponack

[57] ABSTRACT

A polyurethane adhesive composition containing an oxy acid of phosphorus or a derivative thereof, a carboxylic acid or an anhydride thereof, a silane coupling agent and an epoxy resin can serve as an adhesive for manufacturing food packaging materials, for instance, giving bonds having very good bond strength, heat resistance and hot water resistance between a metal foil and a plastic film.

9 Claims, No Drawings

POLYURETHANE ADHESIVE OF EPOXY RESIN, POLYISOCYANATE, PHOSPHORUS OXY ACID, AND CARBOXYLIC ACID

This application is a division of Ser. No. 370,747, filed Jun. 20, 1989, now U.S. Pat. No. 5,096,980.

This invention relates to a polyurethane adhesive composition which gives excellent adhesive performance with respect to package or wrapping contents and to boiling water. More particularly, it relates to a polyurethane adhesive composition for food packaging having excellent bond strength, food resistance and hot water resistance in the manufacture of composite films by lamination of various plastic films, metal foils and so forth.

In recent years, multilayer composite films having two, three or four layers have been developed for use as packaging materials for foods and so forth by laminating one or more plastic films, such as polyethylene, polypropylene, nylon, polyester and polyvinyl chloride films, and a metal foil, such as an aluminum foil, and are in wide use.

For the adhesion of such plastic films or metal foils, it has already been proposed that a derivative of an oxy acid of phosphorus, an epoxy resin and a silane coupling agent should be incorporated in a composition containing an organic polyisocyanate and a polyol (Japanese Patent Publication No. 4864/1986).

It has also been proposed that a polybasic acid anhydride containing at least two acid anhydride groups should be incorporated in a mixture of an organic polyisocyanate and an organic polymer polyol (Japanese Laid-open Patent Application Kokai No. 47775/1986).

However, packaging materials produced by using such adhesives as mentioned above are not fully satisfactory in bond strength and are disadvantageously insufficient in heat resistance and chemical resistance, such as acid resistance and alkali resistance. Thus, for instance, when a package containing a free fatty acid-containing food showing high acidity is retort-sterilized with hot water having a high temperature of at least 120° C., the metal foil-plastic film bond strength decreases and, at the same time, the strength of the packaging material itself decreases. In extreme cases, complete delamination takes place and causes the metal foil to have pinholes, which in turn decrease the air barrier property intrinsic to the metal. As a result, the intended long-term preservation of foods cannot be achieved in such cases.

Furthermore, when vinegar or a highly acidic food with a high free fatty acid content is packaged, the bond strength decreases during long-term storage even in the absence of a high-temperature sterilization procedure such as boiling or retort-sterilization, and the plastic film may eventually peel off the metal foil.

The present inventors conducted various intensive investigations to overcome the drawbacks mentioned above and, as a result, found that a polyurethane adhesive composition capable of giving a bond of definitely superior bond strength, food resistance and resistance to boiling water as compared to the prior art compositions can be obtained when an oxy acid of phosphorus or a derivative thereof, a carboxylic acid or an anhydride thereof and an epoxy resin are incorporated into a mixture of an organic polyisocyanate component and a polyol component. On the basis of this finding, they have now completed the present invention.

Thus the invention provides a polyurethane adhesive composition which comprises an organic polyisocyanate, a polyol, an oxy acid of phosphorus or a derivative thereof, a carboxylic acid or an anhydride thereof and an epoxy resin.

As the polyisocyanate component to be used in the practice of the invention, there may be mentioned, among others, aliphatic diisocyanates, for example, alkylene diisocyanates of 3-12 carbon atoms such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatomethyl caprate, cycloaliphatic diisocyanates of 5-15 carbon atoms, such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,4-bis(isocyanatomethyl)cyclohexane and 1,3-bis(isocyanatomethyl)cyclo hexane, aromatic diisocyanates, such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate or a mixture thereof, 4,4'-toluidine diisocyanate, dianisidine diisocyanate and 4,4'-diphenyl ether diisocyanate, aromatic-aliphatic diisocyanates, such as 1,3- or 1,4-xylylene diisocyanate or a mixture thereof, omega, omega'-diisocyanato-1,4-diethylbenzene and 1,3- or 1,4-bis-(isocyanate-1-methyl ethyl benzene) or a mixture thereof, aromatic triisocyanates, such as triphenylmethane-4,4',4"-triisocyanate, 1,3,5-triisocyanatobenzene and 2,4,6-triisocyanatotoluene, aromatic tetraisocyanates, such as 4,4'-diphenyldimethylmethane-2,2',5,5'-tetraisocyanate, other monomeric polyisocyanates, dimers or trimers or biurets or allophanates derived from the monomeric polyisocyanates mentioned above, 2,4,6-oxadiazinetrione ring-containing polyisocyanates obtainable from carbon dioxide and the above-mentioned monomeric polyisocyanates, products of addition of the above isocyanate compounds to low-molecular-weight polyols having a molecular weight less than 200, such as ethylene glycol, propylene glycol, butylene glycol, hexylene glycol, neopentyl glycol, 1,6-hexaneglycol, 3-methyl-1,5-pentane diol, 3,3'-dimethylol heptane, cyclohexanedimethanol, diethylene glycol, triethylene glycol, dipropylene glycol, glycerol, trimethylolpropane, pentaerythritol and sorbitol, products of addition of the above isocyanate compounds to those polyester polyols, polyether polyols, polyetherester polyols, polyesteramide polyols, polycaprolactone polyols, polyvalerolactone polyols, acrylic polyols and polyhydroxyalkanes that have a molecular weight of about 200–200,000 and are to be mentioned later herein in more detail, and products of addition of the above isocyanate compounds to castor oil.

As the polyol component to be used in the practice of the invention, there may be mentioned those polyol compounds having about 2–6, preferably about 2–4 functional groups, a number average molecular weight of about 200–200,000, preferably about 300–100,000, more preferably about 300–50,000, and an acid value of about 0–280, preferably about 0–100, more preferably about 0–50 mg KOH/g. More specifically, there may be mentioned polyester polyols, polyether polyols, polyetherester polyols, polyesteramide polyols, acrylic polyols, polyhydroxyalkanes, castor oil, polyurethane polyols, and mixtures of these.

Examples of such polyester polyols are polyester polyols obtainable by reacting at least one dibasic acid, for example, aromatic dicarboxylic acid of 4-10 carbon atoms such as terephthalic acid and isophthalic acid, or aliphatic dicarboxylic acid of 4-10 carbon atoms such as adipic acid, azelaic acid and sebacic acid, either as such or in the form of a dialkyl ester, with at least one glycol, for example, alkylene glycol of 2-8 carbon atoms such as ethylene glycol, propylene glycol, diethylene glycol, butylene glycol, neopentyl glycol, 1,6-hexane glycol, 3-methyl-1,5-pentane diol, 3,3'-dimethylol heptane, polyoxyethylene diol, polyoxypropylene diol or polytetramethyleneether glycol, and polyester polyols such as polycaprolactone polyvalerolactone or poly($\beta$-methyl-$\gamma$-valerolactone).

Examples of the polyether polyols are polyether polyols obtainable by polymerizing an oxirane compound, such as ethylene oxide, propylene oxide, butylene oxide or tetrahydrofuran, with water or a low-molecular-weight polyol, such as ethylene glycol, propylene glycol, trimethylolpropane or glycerin, as an initiator.

Examples of the polyesteramide polyols are polyols obtainable by combinedly using an amino group-containing starting material, such as ethylenediamine, propylenediamine or hexamethylenediamine, in the polyesterification reaction mentioned above.

Examples of the acrylic polyols are polyols obtainable by copolymerizing a polymerizable monomer having at least one hydroxyl group in each molecule, such as hydroxyethyl acrylate, hydroxypropyl acrylate or hydroxybutyl acrylate, or a corresponding methacrylate, with acrylic acid or methacrylic acid, or an ester thereof.

As the polyhydroxyalkanes, there may be mentioned liquid rubbers obtainable by copolymerization with butadiene or butadiene and acrylamide, for instance.

The polyurethane polyols are polyols having the urethane bond in each molecule and may be obtained by reacting a polyether polyol, polyester polyol, polyetherester polyol or the like, which has a number average molecular weight of about 200-5,000, with an organic polyisocyanate such as mentioned above in the NCO-/OH ratio of less than about 1, preferably not more than about 0.8.

Furthermore, in addition to the polyols mentioned above, a low-molecular-weight polyol having a number average molecular weight of 62 to 200 may be used additionally for the purpose of adjusting the average molecular weight of the polyol component. As examples of such low-molecular-weight polyol, there may be mentioned glycols usable for preparation of polyester polyols such as ethylene glycol, propylene glycol, butylene glycol, diethylene glycol, dipropylene glycol, hexylene glycol, neopentyl glycol, cyclohexanedimethanol, and polyols such as glycerin, trimethylolpropane and pentaerythritol.

In accordance with the invention, an oxy acid of phosphorus or a derivative thereof, carboxylic acid or an anhydride thereof and an epoxy resin are incorporated into a mixture of the above-mentioned organic polyisocyanate and polyol components.

Among the oxy acids of phosphorus and derivatives thereof usable in the practice of the invention, the oxy acids of phosphorus are phosphorous or phosphoric acid compounds, such as hypophosphorous acid, phosphorous acid, orthophosphoric acid and hypophosphoric acid, and condensed phosphoric acids, such as metaphosphoric acid, pyrophosphoric acid, tripolyphosphoric acid, polyphosphoric acid and ultraphosphoric acid. As the above-mentioned derivatives of oxy acids of phosphorus, there may be mentioned phosphates and condensed phosphates of sodium, potassium and so on, monoesters, such as monomethyl orthophosphate, monoethyl orthophosphate, monopropyl orthophosphate, monobutyl orthophosphate, mono-2-ethylhexyl orthophosphate, monophenyl orthophosphate, mono-methyl phosphite, monoethyl phosphite, monopropyl phosphite, monobutyl phosphite, mono-2-ethylhexyl phosphite and monophenyl phosphite, di- and triesters, such as di-2-ethylhexyl orthophosphate, diphenyl orthosphosphate, trimethyl orthophosphate, triethyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphite and triphenyl phosphite, and mono-, di- and triesters from condensed phosphoric acids and alcohols, for example products of addition of an epoxy compound, such as ethylene oxide or propylene oxide, to the above-mentioned oxy acids of phosphorus.

The above-mentioned oxy acids of phosphorus or derivatives thereof may be used either singly or in the form of a mixture of two or more of them.

Among the above-mentioned compounds, those having at least one free acid group are particularly preferred. Thus preferred are orthophosphoric acid, polyphosphoric acid, and partial epoxy compound adducts derived from orthophosphoric acid or polyphosphoric acid. They are added in a amount of about 0.01-10% by weight, preferably about 0.05-5% by weight, more preferably about 0.1-1% by weight, based on the weight of the whole composition.

As the carboxylic acid or an anhydride thereof to be used in accordance with the invention, there may be mentioned those carboxylic acids or anhydrides thereof having one or more carboxyl groups in its molecule, for example, mono carboxylic acid of 2-18 carbon atoms such as acetic acid, lactic acid, propionic acid, oleic acid, or polycarboxylic acid of 3-14 carbon atoms such as malonic acid, succinic acid, maleic acid, phthalic acid, pyromellitic acid, benzophenonetetracarboxylic acid, 2,3,6,7-naphthalinetetracarboxylic acid and 5-(2,5-dioxotetrahydrofuryl)-3-methyl-3-cyclohexene-1,2-dicarboxylic acid and anhydrides thereof. These may be used either singly or in the form of a mixture of two or more of them. Furthermore, these carboxylic acids and anhydrides thereof may be contained in the composition either in a form chemically bonding to the polyol component or the epoxy resin mentioned below or as a mere mixture component without chemical bonding. The acid or anhydride thereof is added in an amount of about 0.01-20% by weight, preferably about 0.05-10% by weight, more preferably about 0.1-5% by weight, based on the weight of the whole composition.

As the epoxy resin to be used in the practice of the invention there are, for example, reaction products from a polyhydric phenol, such as bisphenol A, bisphenol F, bisphenol AD or tetrahydroxydiphenylethane, and a polyfunctional halohydrin, such as epichlorohydrin, which have a molecular weight of about 320-200,000, preferably about 320-4,000. The epoxy resin is used in an amount of about 0.1-50% by weight, preferably about 1-30% by weight, based on the weight of the whole adhesive composition.

These epoxy resins may be contained in the composition either in a form chemically bonding to the carboxylic acid or oxy acid of phosphorus or as a mere mixture component without chemical bonding.

The polyurethane adhesive composition according to the invention can be prepared by mixing the above-mentioned organic polyisocyanate component, polyol component, oxy acid of phosphorus or derivative thereof, carboxylic acid or anhydride thereof and epoxy resin.

For further improving the adhesive characteristics of the composition obtained in the above manner, a silane coupling agent may be added. Any of silane coupling agents of the structural formula $R\text{-}Si(X)_3$ or $R\text{-}Si(R')(X)_2$, wherein R is an organic group having a vinyl, epoxy, amino, imino or mercapto group, R' is a lower alkyl group of 1-3 carbon atoms and X is an alkoxy group of 1-3 carbon atoms such as methoxy or ethoxy or a chlorine atom, may be used. Examples are chlorosilanes, such as vinyltrichlorosilane, aminosilanes, such as N-(dimethoxymethylsilylpropyl)ethylenediamine and N-(triethoxysilylpropyl)ethylenediamine, epoxysilanes, such as γ-glycidoxypropyltrimethoxysilane, γ-glycidoxypropyltriethoxysilane, and vinylsilanes, such as vinyltriethoxysilane. The silane coupling agent is used preferably in an amount of about 0.1-5% by weight based on the weight of the whole adhesive composition.

Furthermore, to the polyurethane adhesive composition of the invention, other additives, such as antioxidants, ultraviolet absorbers, hydrolysis preventing agents, antifungal agents, thickening agents, plasticizers, pigments and fillers, may be added as necessary. For controlling the curing reaction, catalysts, additives and other agents known for that purpose may be used. The composition may be used in the form of a one-can type composition or two-can type composition, as the case may be.

Thus, the one-can type composition can be prepared by reacting the organic polyisocyanate under isocyanato group excess conditions with a homogeneous mixture of the polyol, oxy acid of phosphorus or derivative thereof, carboxylic acid or anhydride thereof and epoxy resin beforehand. This type reacts with water or the moisture in the air and thus cures and causes adhesion. In the manufacture of the one-can type, it is to carry out the reaction between the isocyanate groups (NCO) and the active hydrogen groups (H) in the polyol, oxy acid of phosphorus or derivative thereof and epoxy resin in an NCO/H ratio of about 1.2-20, preferably about 1.5-10. When the NCO/H ratio is less than 1.2, the resulting composition has an excessively high viscosity and may gelate in some instances. When the NCO/H ratio is higher than 20, the curability becomes poor and, in some instances, no sufficient bond strength can be obtained. Generally, the reaction is carried out at about 30° C.-100° C., optionally in the presence of an organometal catalyst, a tertiary amine catalyst and/or the like.

In another aspect of the invention, there may be mentioned the so-called two-can type where the organic polyisocyanate component is used as the curing agent and the polyol as the main component. They are mixed together just prior to use. The oxy acid of phosphorus or derivative thereof may contained in the organic polyisocyanate component or in the polyol component. It is preferable, however, to add the same beforehand to the mixture of polyol, carboxylic acid or anhydride thereof and epoxy resin. In the case of two-can type, the curing agent and main component are mixed together in a mixing ratio such that the NCO/H ratio amounts to about 0.4-10, preferably about 0.5-2.0. In the case of two-can type, too, a catalyst, such as an organometal catalyst and/or a tertiary amine, may be used, as in the case of one-can type.

Generally, the two-can type shows a higher curing speed, is superior in adhesion characteristics and has a broader range of application as compared with the one-can type. Although the two-can type has a short pot life, it can be used without any trouble when an apparatus is used which can feed the main component and curing agent from separate systems in minimum necessary amounts in a predetermined quantity ratio and mix them just prior to use.

When the adhesive-forming composition according to the invention has a viscosity of about 100-10,000 cps, preferably about 100-5,000 cps, at the temperature range of ordinary temperature to 140° C., preferably ordinary temperature to 100° C., said composition can be used without using any solvent.

When the composition has a viscosity higher than the above range, said composition, whether it is of the one-can type or of the two-can type, may be diluted with an organic solvent. Any of organic solvents inert to the isocyanate group, for example esters, such as ethyl acetate, ketones, such as methyl ethyl ketone, and aromatics, such as toluene and xylene, may be used.

In using the polyurethane adhesive composition according to the invention in practice, the adhesive composition is coated on the film surface by means of a laminator of the solvent type or solventless type. When the composition is of the solvent type, the solvent is caused to evaporate and then the adhesive surface is submitted to lamination while, in the case of a solventless type composition, the adhesive surface is directly submitted to lamination. The composition is then cured and hardened at ordinary temperature or with warming.

The solventless type composition is used generally in a coating amount of about 1.0-2.0 g/m$^2$ and the solvent type composition in a coating amount of about 2.0-5.0 g/m$^2$.

The adhesive composition according to the invention, can be cured faster as compared with the conventional urethane adhesives and is superior in adhesive performance. Particularly when applied to plastic films, such as polyethylene terephthalate, nylon, polyethylene, polypropylene and polyvinyl chloride films, plastic films metallized with aluminum, silicon oxide, silicon nitride and metals, such as aluminum, stainless steel, iron, copper and lead, said composition can provide very good bond strength, heat resistance, water resistance and chemical resistance.

The polyurethane adhesive composition according to the invention, in which an oxy acid of phosphorus or a derivative thereof, a carboxylic acid or an anhydride thereof and an epoxy resin are combinedly used additionally, can serve as an adhesive for manufacturing food packaging materials, for instance, giving bonds having very good bond strength, heat resistance and hot water resistance between a metal foil, such as an aluminum foil, and a plastic film, such as a polyethylene, polypropylene, nylon or polyethylene terephthalate film. The food packaging materials obtained by using said composition can be advantageously used as favorable packaging materials showing good resistance to foods and capable of preserving foods stably for a long period, without delamination, i.e. failure of the metal foil-plastic film bond, even when subjected to high-temperature hot water sterilization at 120° C. or above in the state in which the packaging materials are filled with a food and tightly closed.

The following examples and comparative examples are further illustrative of the present invention. In the examples, "%" means "% by weight".

EXAMPLES (1) Transesterification was carried out between 194.2 g of dimethyl terephthalate and 248.3 g of ethylene glycol at 160°-220° C. under a nitrogen stream in the presence of 0.2 g of zinc acetate. When the calculated amount of methanol had been distilled off, 83.1 g of isophthalic acid was added, and esterification was conducted at 200°-220° C. When the calculated amount of water had been distilled off, 282.3 g of azelaic acid was added, and esterification was carried out at 220°-230° C. The pressure was gradually reduced and condensation was conducted at 220°-230° C. for 60 minutes. Poly-condensation reaction was then continued at 1-2 mmHg and 220°-230° C. for 4 hours. Thus was obtained a polyester glycol having a number average molecular weight of about 50,000. Hereinafter, this solution is referred to as "polyol A". A 50-g portion of the polyester glycol obtained was dissolved in 67 g of ethyl acetate, and to this solution were added 2 g of phthalic anhydride, 0.1 g of phosphoric acid and 15 g of epoxy resin (Epikote 1002; product of Shell Chemical). The mixture was stirred for 4 hours at 60° C. to give a solution having a solid content of 50%. Hereinafter, this solution is referred to as "main component A".

(2) To 50 g of Polyol A was added 2 g of maleic anhydride and reacted for 3 hours at 140° C. This reaction mixture was dissolved into 67 g of methyl ethyl ketone, and there were added 0.1 g of phosphoric acid and 15 g of epoxy resin (Epikote 1002; product of Shell chemical) to give a solution having a solid content of 50%.

Hereinafter, this solution is referred to as "main component B".

(3) A polyester glycol having a number average molecular weight of about 2,500 was prepared by the same method as used for the preparation of polyol A, with an isophthalic acid/sebacic acid mole ratio of 1/1 and an ethylene glycol/neopentyl glycol mole ratio of ½. This polyester glycol is hereinafter referred to as "polyol B".

To 100 g of polyol B was added 2 g of phthalic anhydride, and this mixture was reacted for 3 hours at 140° C.

The reaction mixture was cooled to 100° C. and 30 g of epoxy resin (Epikote 1002; product of Shell Chemical) was added. The mixture was melt-blended uniformly and 0.1 g of phosphoric acid was added to give a solventless type adhesive composition. This composition is hereinafter referred to as "main component C".

(4) A mixture of 100 g of polyol B, 6.2 g of isophorone diisocyanate, 106.7 g of ethyl acetate and 0.05 g of dibutyltin dilaurate was heated at 65° C. for 7 hours, then 0.5 g of diethylene glycol was added, and the reaction was carried out for an hour. To the reaction mixture were added 2 g of phthalic anhydride, 0.1 g of phosphoric acid, 15 g of epoxy resin (Epikote 1002; product of Shell Chemical, and 17 g of ethyl acetate to give a polyurethane polyol solution having a solid content of 50%. This solution is hereinafter referred to as "main component D".

(5) A mixture of 35.3 g of epoxy resin (Epikote 828; product of Shell Chemical), 5.6 g of acetic acid and 0.008 g of tri (dimethylaminomethyl) phenol was reacted for 4 hours at 110° to 130° C. The reaction mixture was cooled to 60° C. and 50 g of methyl ethyl ketone and 9.1 g of phosphoric acid were added to react for 1 hour.

To 10 g of the above reaction mixture was added 1000 g of a 50% ethylacetate solution of a polyester glycol having a number average molecular weight of about 40,000 and with an isophthalic acid/sebacic acid mole ratio of 1/1 and an ethylene glycol/neopentyl glycol/1,6-hexane glycol mole ratio of 1/1/1 to give a polyester type adhesive composition. This composition is hereinafter referred to as "main component E".

(6) To 50 g of a polyester glycol having a number average molecular weight of about 1,000 and composed of isophthalic acid, adipic acid and dithylene glycol, the isophthalic acid/adipic acid mole ratio being 2/1, was added 5 g of succinic acid and reacted for 3 hours at 110° to 150° C.

The reaction mixture was cooled to 60° C. and 5 g of epoxy resin (Epikote 828; product of Shell Chemical) and 1 g of polyphosphoric acid were added to give a solventless type adhesive composition. This composition is hereinafter referred to as "main component F".

(7) A mixture of 500 g of polyoxypropylene glycol (number average molecular weight about 1,000), 70.3 g of dipropylene glycol, 162.0 g of tolylene diisocyanate, 315.0 g of ethyl acetate and 0.07 g of stannous octoate (catalyst) was heated at 65° C. for 7 hours. After the reaction, 4.9 g of trimethylolpropane was added and the reaction was further conducted for an hour. To the reaction mixture were added 22 g of phthalic anhydride, 221 g of epoxy resin (Epikote 1002; product of Shell Chemical), 1 g of phosphoric acid and 105 g of ethyl acetate to give a polyetherurethane type adhesive composition having a solid content of 70%. This composition is hereinafter referred to as "main component G".

(8) In 100 g of ethyl acetate was dissolved 100 g of isophorone diisocyanate trimer (T 1890/100; product of Huels) having an NCO group content of 17.3% to give a solution having a solid content of 50%. This solution is hereinafter referred to as "polyisocyanate A".

(9) Xylylene diisocyanate (188.2 g) was heated to 90° C. Thereto was added 44.7 g of trimethylolpropane portionwise and the reaction was carried out for 2 hours. Then, 77.6 g of ethyl acetate was added, and the mixture was stirred uniformly. Thus was obtained a solution having a solid content of 75%, an NCO group content of 13.5% and viscosity of 1,800 cps as measured at 25° C. This solution is hereinafter referred to as "polyisocyanate B".

(10) A mixture of 174.2 g of tolylene diisocyanate, 44.7 g of trimethylolpropane and 73.0 g of ethyl acetate was heated at 65° C. for 3 hours. After the reaction, there was obtained a solution having a solid content of 75%, an NCO group content of 14.4% and a viscosity of 1,000 cps as measured at 25° C. This solution is hereinafter referred to as "polyisocyanate C".

(11) A mixture of 100 g of hexamethylene diisocyanate and 0.01 g of trimethylbenzyl ammonium hydroxide was trimerized for 1 hour at 60° C. and then 0.005 g of benzoylchloride was added. From the reaction mixture was removed unreacted hexamethylene diisocyanate monomer at 120° C. under 0.1 mmHg to give 35 g of trimer of hexamethylene diisocyanate.

This trimer has a solid content of 100%, an unreacted monomer content of 0.1%, an NCO group content of 21% and a viscosity of 2,000 cps as measured at 25° C. This polyisocyanate is hereinafter referred to as "polyisocyanate D".

Adhesive compositions 1 to 11 were prepared by compounding the main components A to G, organic polyisocyanate A to D and silane coupling agent as indicated in Table 1 given below.

For comparison, adhesive compositions 51 to 57, which were free of either one or both of the carboxylic acid or anhydride thereof and epoxy resin, were prepared by using the following main components A' to G' as indicated in Table 2 given below and tested in the same manner.

COMPARATIVE EXAMPLES (1) A main component A' having a solid content of 50% was prepared by the same method as used for the preparation of the main component A without addition of phthalic anhydride.

(2) A main component B' having a solid content of 50% was prepared by the same method as used for the preparation of the main component B without addition of maleic anhydride.

(3) A solventless type main component C' was prepared by the same method as used for the preparation of the main component C without addition of phthalic of anhydride and epoxy resin.

(4) A main component D' was prepared by the same method as used for the preparation of the main component D without addition of phosphoric acid.

(5) A main component E' having a solid content of 50% was prepared by the same method as used for the preparation of the main component E without addition of acetic acid.

(6) A main component F' was prepared by the same method as used for the preparation of the main component F without addition of epoxy resin and phosphoric acid.

(7) A main component H' having a solid content of 70% was prepared by the same method as used for the preparation of the main component H without addition of phthalic anhydride.

Laminate films were manufactured by the method to be mentioned later using the respective adhesive compositions defined in Tables 1 and 2. The respective films were tested for plastic film-aluminum foil bond strength, hot water resistance and acid resistance.

The results are shown in Tables 3 and 4.

The test methods were as described below.

MANUFACTURE OF THREE-LAYER LAMINATED FILM

Laminated film: polyethylene terephthalate film (12 μm thickness)/aluminum foil (9 μm thickness)/corona discharge treated cast polypropylene film (70 μm thickness).

The above laminated film was manufactured in the following manner. Thus, each adhesive composition described in Table 1 was coated on the polyethylene terephthalate film by means of a laminator at ordinary temperature. When the composition contained a solvent, the solvent was evaporated. The coated surface was laminated with the aluminum foil surface. Then, the adhesive composition was coated on the other side of the aluminum foil of the resultant laminated film. The solvent, if contained in the composition, was evaporated. The coated surface was adhered to the cast polypropylene film. The laminate film was maintained at 50° C. for 3 days for curing of the adhesive composition.

T-Peel test

Test specimens, 300 mm×15 mm in size, were cut from the composite film manufactured in the above manner and tested for bond strength on an Instron type tensile tester in the manner of T peel at a peeling speed of 300 mm/minute. Each measured value shown, which is given in terms of aluminum foil-cast polypropylene film peel strength (g/15 mm), is an average of five test specimens.

Heat and acid resistance test

Pouches, 13 cm×17 cm in size, were manufactured using the respective composite films and packed with vinegar having a concentration of not lower than 4.2%. The pouches were retort-sterilized at 135° C. for 30 minutes under hot water of a pressure of 4.5 kg/cm² and, then, observed for a sign of delamination between the aluminum foil and polypropylene film, tested for peel strength and, after 7 days of storage at 60° C., examined for peeling. In another system, the hot water retort-sterilization was omitted and the pouches were examined for a sign of delamination otherwise in the same manner. In each example, 5 pouches were used and each result shown in each table is the mean of the corresponding 5 tests.

From the results of the above tests, it is apparent that the addition of an oxy acid of phosphorus or a derivative thereof, a carboxylic acid or an anhydride thereof and an epoxy resin results in marked improvements in the hot water resistance and acid resistance of the adhesive compositions and in the storage stability of resins and that, therefore, the adhesive compositions according to the invention can serve as excellent composite laminate film adhesives in the manufacture of retortable food packaging materials for highly acidic foods.

TABLE 1

|  | Adhesive Composition No. | Main component (weight parts) | | | | | | | Polyisocyanate (weight parts) | | | | Silane Coupling agent (γ-glycidoxy propyl triethoxy silane) |
|---|---|---|---|---|---|---|---|---|---|---|---|---|---|
|  |  | A | B | C | D | E | F | G | A | B | C | D |  |
| This invention | 1 | 100 | | | | | | | 7.5 | | | | |
|  | 2 | 100 | | | | | | | | 7.5 | | | |
|  | 3 | 100 | | | | | | | | | 7.5 | | 1 |
|  | 4 | | 100 | | | | | | | 7.5 | | | |
|  | 5 | | | 100 | | | | | | | | 16 | 1 |

TABLE 1-continued

| Adhesive Composition No. | Main component (weight parts) | | | | | | | Polyisocyanate (weight parts) | | | | Silane Coupling agent (γ-glycidoxy propyl triethoxy silane) |
|---|---|---|---|---|---|---|---|---|---|---|---|---|
| | A | B | C | D | E | F | G | A | B | C | D | |
| 6 | | | 100 | | | | | | 7.5 | | | |
| 7 | | | | 100 | | | | | | 10 | | |
| 8 | | | | 100 | | | | | | 10 | | 1 |
| 9 | | | | | 100 | | | | | | 35 | |
| 10 | | | | | | 100 | | 7.5 | | | | |
| 11 | | | | | | | 100 | 7.5 | | | | 1 |

TABLE 2

| | Adhesive Composition No. | Main component (weight parts) | | | | | | | Polyisocyanate (weight parts) | | | | Silane Coupling agent (γ-glycidoxy propyl triethoxy silane) |
|---|---|---|---|---|---|---|---|---|---|---|---|---|---|
| | | A' | B' | C' | D' | E' | F' | G' | A | B | C | D | |
| Comparative example | 51 | 100 | | | | | | | | | 7.5 | | 1 |
| | 52 | | 100 | | | | | | 7.5 | | | | 1 |
| | 53 | | | 100 | | | | | | | | 16 | 1 |
| | 54 | | | | 100 | | | | 7.5 | | | | |
| | 55 | | | | | 100 | | | | 10 | | | 1 |
| | 56 | | | | | | 100 | | | | | 35 | 1 |
| | 57 | | | | | | | 100 | 7.5 | | | | 1 |

TABLE 3

| | Adhesive Composition No. | Peel strength (g/15 mm) | Heat/acid resistance test | | Storage stability at 60° C. | |
|---|---|---|---|---|---|---|
| | | | Peel strength (g/15 mm) | Existence of delamination | After retort sterilization | No retort sterilization |
| This invention | 1 | 1300 | 1250 | None | No | No |
| | 2 | 1100 | 1100 | None | No | No |
| | 3 | 1100 | 1200 | None | No | No |
| | 4 | 1200 | 1200 | None | No | No |
| | 5 | 1300 | 1250 | None | No | No |
| | 6 | 1400 | 1300 | None | No | No |
| | 7 | 1000 | 900 | None | No | No |
| | 8 | 1300 | 1200 | None | No | No |
| | 9 | 1000 | 850 | None | No | No |
| | 10 | 950 | 800 | None | No | No |
| | 11 | 1000 | 900 | None | No | No |

TABLE 4

| | Adhesive Composition No. | Peel strength (g/15 mm) | Heat/acid resistance test | | Storage stability at 60° C. | |
|---|---|---|---|---|---|---|
| | | | Peel strength (g/15 mm) | Existence of delamination | After retort sterilization | No retort sterilization |
| Comparative example | 51 | 1250 | 1000 | None | Partial delamination | Complete delamination |
| | 52 | 1200 | 950 | None | Partial delamination | Complete delamination |
| | 53 | 700 | 250 | Partial delamination | Complete delamination | Complete delamination |
| | 54 | 650 | 200 | Partial delamination | Complete delamination | Complete delamination |
| | 55 | 800 | 100 | Partial delamination | Complete delamination | Complete delamination |
| | 56 | 950 | 50 | Partial delamination | Complete delamination | Complete delamination |
| | 57 | 700 | 10 | Partial delamination | Complete delamination | Complete delamination |

What is claimed is:

1. A polyurethane adhesive composition which comprises an organic polyisocyanate, a polyol, from about 0.01-10% by weight of an oxy acid of phosphorus or a derivative thereof, from about 0.01-20% by weight of a carboxylic acid or an anhydride thereof, a silane coupling agent and from about 0.1-50% by weight of an epoxy resin, all percentages based on the weight of the whole composition, wherein the ratio of the number of NCO groups of the organic polyisocyanate to the number of active hydrogen groups of the polyol, oxy acid of phosphorus or a derivative thereof and epoxy resin (NCO/H) is about 1.2–20:1 for a one-can adhesive or 0.4–01:1 for a two-can adhesive.

2. The polyurethane adhesive composition as claimed in claim 1, wherein the organic polyisocyanate is a trimer derived from a monomeric polyisocyanate.

3. The polyurethane adhesive composition as claimed in claim 1, wherein the organic polyisocyanate is a product of addition of a diisocyanate to a low-molecular-weight polyol.

4. The polyurethane adhesive composition as claimed in claim 1, wherein the polyol is a polyester polyol.

5. The polyurethane adhesive composition as claimed in claim 1, wherein the polyol is a polyurethane polyol obtained by reacting a polyester polyol having a number average molecular weight of about 200–5,000 and a low-molecular-weight polyol having a number average molecular weight of 62 to 200 with an organic polyisocyanate.

6. The polyurethane adhesive composition as claimed in claim 1, wherein the oxy acid of phosphorus is phosphoric acid.

7. The polyurethane adhesive composition as claimed in claim 1, wherein the carboxylic acid or anhydride thereof is maleic anhydride, phthalic anhydride, acetic acid or succinic acid.

8. The polyurethane adhesive composition as claimed in claim 1, which is a two-can adhesive.

9. The polyurethane adhesive composition as claimed in claim 1, wherein the silane coupling agent is an epoxysilane.

* * * * *